July 11, 1972   H. A. ECKHARDT   3,676,035

APPARATUS FOR PROCESSING PLASTIC MATERIALS

Filed Sept. 18, 1968   2 Sheets-Sheet 1

INVENTOR.
H. A. ECKHARDT
BY H A Eckhardt

July 11, 1972 H. A. ECKHARDT 3,676,035
APPARATUS FOR PROCESSING PLASTIC MATERIALS
Filed Sept. 18, 1968 2 Sheets-Sheet 2

INVENTOR.
H. A. ECKHARDT
BY HAEckhardt

United States Patent Office 3,676,035
Patented July 11, 1972

3,676,035
APPARATUS FOR PROCESSING PLASTIC
MATERIALS
Hans A. Eckhardt, 55 Crescent Bend,
Allendale, N.J. 07401
Filed Sept. 18, 1968, Ser. No. 760,515
Int. Cl. B29f 1/00
U.S. Cl. 425—203                                    19 Claims

ABSTRACT OF THE DISCLOSURE

An apparatus for extruding, injection molding, blow molding and transfer molding plastic materials comprise a feed screw pressing plastic material over a rotor with a diameter which first increases in order to mill and shear the material over a spreading circumference, and then decreases in order to work and stretch the plastic material centripetally. The feed screw is closely surrounded by a barrel, and the rotor by a first and a second housing ending in a discharge opening, through which a flighted screw extends in a closely surrounding cylinder. The flighted screw is firmly attached to the end of the rotor for extrusion operation. For injection molding, the flighted screw is mounted for axial and rotational movement through a bore in the rotor. For piston injection molding, a piston extends through the bore of the rotor. The generatrices of the rotor and housing surfaces form acute angles between opposite proximate sections of these surfaces, corresponding to the requirements of different plastic materials. Rotor and housing surfaces are provided with protrusions to achieve specific processing tasks. An opening in the housing near the maximum rotor surface serves to devolatilize gases and vapors. Rotor and housing are axially movable to each other, to vary and control the processing spaces therebetween.

The present invention relates to an apparatus for processing plastic materials, and in particular to apparatus for extruding, injection molding, blow molding, transfer molding, and otherwise forming plastic materials.

To extrude, injection mold, blow mold, and transfer mold plastic material it is necessary to heat, compress, mix, disperse, shear, work, degas and convey the material, and it is combinations of these treatments which will be referred to in this specification as processing. Plastic materials are defined in this specification as materials exhibiting viscous as well as elastic behavior while being processed.

For extruding, injection molding, blow molding, and transfer molding of plastic materials screw machines have been in use for a long time, primarily consisting of a barrel with a cylindrical bore, a die at one end, a feed opening at the other end, and one or more screws rotating therein with close clearance. In spite of many improvements, for example in screw design, these conventional screw extruders often perform the task of processing not efficiently or uniformly, one of the reasons being that screw machines have been acknowledged to be suitable means for conveying and compressing, but much less for efficient, measured and uniform heating, mixing, dispersing, shearing and working.

There are other extruders known which employ two parallel plates, one of them rotating, wherein the plastic material is worked in the space between the flat opposite faces of these plates, and is discharged through a central orifice in the stationary plate. These extruders make use of a natural phenomenon which has been called the normal force effect, and which has been described in the scientific literature during the past few decades. The most widely known illustration of the normal force effect has been given by K. Weissenberg in "Nature," Mar. 1, 1947, vol. 159, p. 310–311, and a detailed description of applications in "Modern Plastics" magazine of October 1959, page 107, in an article by Bryce Maxwell and Anthony J. Scalora. Machines built along these lines have been called centripetal extruders, or elastic melt extruders.

While centripetal extruders offer a number of advantages, their practical application has been very limited by several basic drawbacks. One of the disadvantages is the fact that at the start-up plastic material particles fed in the form of powder, flake, beads, or granules fall downward within the air space between the rotating and the stationary surface to the bottom of the heating chamber where they often cake together to such an extent that they are not brought back between the rotating and the stationary surface even by auxiliary means, and prevent further uniform feeding. Another drawback is that other plastic material particles reach the center of the two plates without having undergone suitable conditions of temperature, pressure, and mechanical working, and therefore constitute portions of lower temperature and higher viscosity in the extrudate which thus becomes unusable. Oftentimes the die orifice is getting clogged by such harder and colder particles.

A further disadvantage is that the plastic material fed in the form of powder, flake, beads or granules has, for some time after entering the space between the rotating and stationary disks, neither a viscous nor an elastic behavior, and therefore is more exposed to gravitational forces letting it fall out at the bottom of the heating chamber, and to centrifugal forces preventing continuous and uniform feeding of material than to centripetal forces as desired. In addition, with bigger machines having larger plate diameters, even such particles which have achieved elastic and viscous properties, are travelling at such a larger diameter arc that the centripetal effect is unable to overcome the centrifugal forces, thus interrupting the desirable uniform spiral flow toward the center.

Another known device uses a screw to feed plastic material in the space between the smaller ends of a conical stator and a conical rotor, sometimes equipped with ribs. Such devices have been found to be suitable only for a very small number of plastic materials, for about one type out of one hundred, while all the other plastic material types have shown excessive decomposition and overheating a short time after the start-up, thus rendering the device unusable. Even with one of the few applicable materials the product emerges from the unobstructed cylindrical space in form of irregularly shaped chunks which require an additional extruder or injection molding machine for final processing. If an extruder is attached, the irregularly shaped chunks have to be restricted in their unimpeded exit from the cylindrical space in order to emerge only at a small segment at the top of the cylindrical space from where they drop into the extruder chute; they suffer considerable heat losses, undesirable oxygen contact due to the difficulties in effectively enclosing such aggregate equipment for evacuating and purging, and oftentimes agglomeration of the sticky, tacky chunks in the extruder chute, thus interrupting continuous extrusion.

It is an object of the present invention to provide an apparatus and method for processing plastic materials which eliminates the difficulties heretofore described.

It is a further object of the invention to provide apparatus which pressure feeds the particulate material to an adjustable conical space of increasing diameter with such a configuration that a wide variety of plastic materials, including heat sensitive materials, can be sheared, worked, mixed and dispersed reliably and effectively.

It is a further object of the invention to provide apparatus to feed the sheared and worked plastic material from the entire circumference of the conical space of increasing diameter, without restriction to a small segment thereof, to the entire periphery of a conical space of decreasing diameter to centripetally shear, work, mix and disperse the material.

It is a further object of the invention to avoid heat losses and agglomeration of plastic material emerging from the conical space of increasing diameter, and to provide apparatus for shearing and working the plastic material in an immediately subsequent conical space of decreasing diameter.

It is a further object of the invention to avoid oxygen contact and porosity of the plastic material, and to provide apparatus for subjecting the plastic material to vacuum or a protective gas atmosphere by removing the air through a duct near the transition from the conical space of increasing diameter to the conical space of decreasing diameter, and by enclosing the conical spaces in a simple effective manner.

It is a further object of the invention to avoid powder, flake, beads or granules dropping through the air space between the plates to the bottom of a centripetal extruder, and to provide apparatus for feeding plastified material to the entire periphery where it adheres to the working surfaces and is subject to the normal force effect.

It is a further object of the invention to avoid caking and agglomeration of plastic material particles in spaces outside the plate surfaces of a centripetal extruder, and to provide apparatus having spaces subject to continuous flow, thus eliminating stagnation.

It is a further object of the invention to prevent material particles from reaching the center of the plates of a centripetal extruder and clogging the die orifice without having undergone effective plastification by mechanical working, heat and pressure, and to provide apparatus exposing the plastic material to sufficiently high shearing stresses, temperatures and pressures.

It is a further object of the invention to avoid material particles without viscous and elastic behavior entering the space between the plates of a centripetal extruder, and to provide apparatus subjecting only plastified material with viscous and elastic characteristics to centripetal processing.

It is a further object of the invention to avoid excessively large plate diameters on centripetal extruders as well as excessive centrifugal forces, and to provide apparatus using centripetal surfaces of limited diameter and obtaining the additional processing length and time by using preceding conical shearing surfaces of increasing diameters.

It is a further object of the invention to prevent the normal force effect of a centripetal extruder from excessively diminishing toward the center, and to provide apparatus having protrusions at its rotor surface where the centrifugal force is greatest, forcing the plastic material in centripetal direction, particularly essential with diverging, non-parallel surfaces. For the same object, the apparatus has a smaller inner rotor rotating with the extrusion screw at a higher speed than the larger outer rotor.

It is a further object of the invention to provide apparatus for subjecting plastic material to two different principles of mechanical working, by shearing, stretching, milling, kneading, mixing, and dispersing the material first in a processing space of increasing diameter, and subsequently in a processing space of decreasing diameter.

It is a further object of the invention to avoid the aggregation of thrust loads in only one direction and to provide apparatus compensating the rearward thrust at least partially by generating a forward thrust.

It is a further object of the invention to avoid an excessive processing length and to provide apparatus for working plastic material first in a conical space of increasing diameter and subsequently in a conical space of decreasing diameter and of reverse axial direction.

It is a further object of the invention to prevent plastified hot material from remaining in an irregular shape for any period of time and to provide apparatus for uninterruptedly working the plastic material.

It is a further object of the invention to avoid the use of screws as main tools for shearing, kneading, mixing, and dispersing plastic material, and to provide apparatus for shearing, kneading, mixing, and dispersing plastic material between surfaces of increasing and decreasing diameter, and essentially for feeding, conveying and compressing the plastic material by a helical screw.

These and other objects, advantages, and features of the invention will be apparent during the course of the following description when taken in connection with the accompanying drawings wherein.

Figure 1:
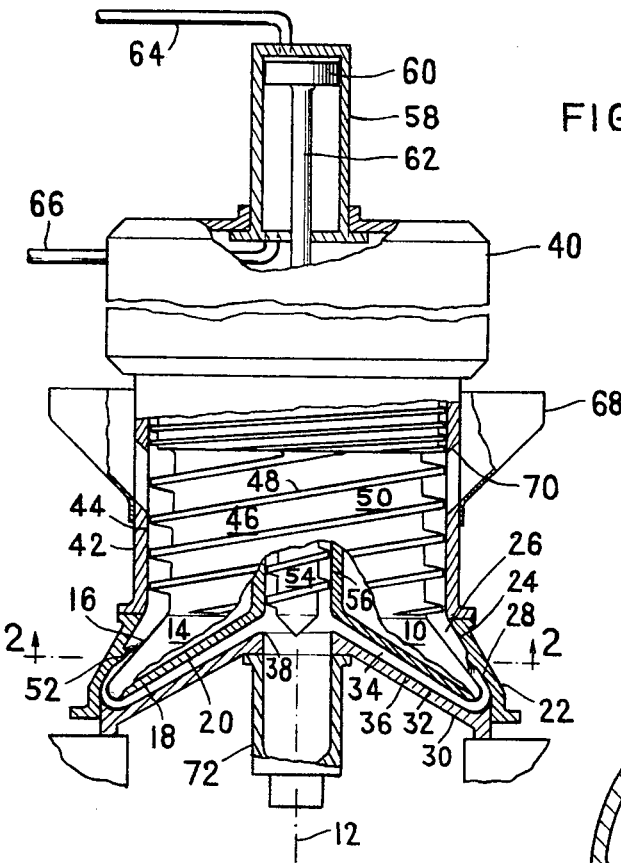
FIG. 1 is an elevational view, partly in section, showing one embodiment of the apparatus of the invention.
Figure 2:
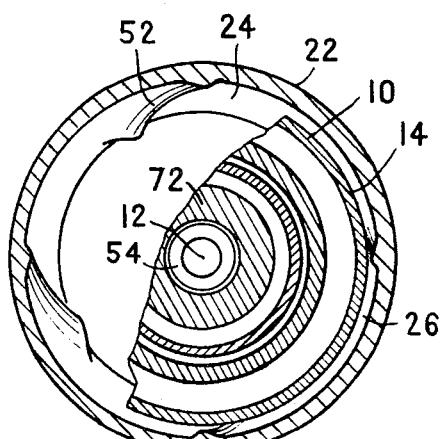
FIG. 2 is a sectional view taken along the lines 2—2 of FIG. 1, viewed in the direction of the arrows.

Referring to the drawings, FIGS. 1 and 2, there is shown an apparatus for processing plastic materials comprising a rotor 10 mounted for rotation about the axis 12 thereof, which has a first surface 14 with a generatrix 16 having a radial distance to the axis 12 which increases from a first radius, the rotor entrance radius, to a larger radius, the maximum rotor radius. The rotor 10 has a second adjacent surface 18 with a generatrix 20 having a radial distance to the axis 12 which decreases from the maximum rotor radius toward the axis 12. A first housing 22 has an interior surface 24 surrounding the first rotor surface 14 in a spaced relationship to define a processing space 26 therebetween, and having a generatrix 28 with a radial distance to the axis 12 which increases from a first radius, the housing entrance radius, to a larger radius, the maximum housing radius. The housing entrance radius is smaller than the maximum rotor radius. A second housing 30 has an interior surface 32 disposed to the second rotor surface 18 in opposite spaced relationship to define a processing space 34 therebetween, and having a generatrix 36 with a radial distance to the axis 12, which decreases from the maximum housing radius to the radius of a discharge opening 38 in the center of the second housing surface 32. The radius of the discharge opening 38 is substantially smaller than the maximum radius of the rotor 10, and the axis of the discharge opening 38 coincides with the axis 12 of the rotor 10.

Means for rotating the rotor 10 are contained in the rear housing 40. The means for introducing plastic material in the processing space 26 between the first housing surface 24 and the first rotor surface 14 comprise a barrel 42 attached to the first housing 22 with an interior surface 44 extending from the first housing interior surface 24 and approaching the first housing interior surface 24 at a radius equal to the housing entrance radius. A feed screw 46 extends through the barrel 42, has helical flights 48 with close clearance to the barrel interior surface 44, has a screw root 50 with a radius equal to the entrance radius of the rotor 10, and is attached to the rotor 10 at the entrance radius of the rotor 10. From a hopper 68 the plastic material passes through the openings 70 in the barrel 42 between the helical flights 48 of the feed screw 46.

The generatrix 16 of the first surface 14 of the rotor 10 forms an acute angle with the generatrix 28 of the interior surface 24 of the first housing 22. The generatrix 16 of the first surface 14 of the rotor 10 has a gradual transition to the generatrix 20 of the second surface 18 of the rotor 10. The generatrix 28 of the interior surface 24 of the first housing 22 has a gradual transition to the generatrix 36 of the interior surface 32 of the second housing 30. The interior surface 24 of the first housing 22 has protrusions extending toward the surrounded opposite surface 14 of the rotor 10 in the form of slanted ribs 52.

There are means provided in the rear housing 40 for axially moving the rotor 10, the first housing 22, and the second housing 30 relatively to each other, so that the spaced relationship between the surfaces 14, 18, 24, 32 of the rotor 10, the first housing 22 and the second housing 30 can be varied and controlled. An injection screw 54 extends through a co-axial bore 56 in the rotor 10, mounted rotatably and axially movable through the discharge opening 38 and an injection cylinder 72. Of the means for rotatably and axially moving the injection screw 54 are shown the injection cylinder 58, the injection piston 60, the injection rod 62, and the hydraulic connectors 64 and 66, while the balance contained in the rear housing 40 is not shown in detail, as any known means providing rotating and axial movement of the injection screw 54 can be used.

In operation, the plastic material is fed with the feed screw 46 downward through the barrel 42, is plastified in the annular adjustable processing space 26 of increasing diameter between the first surface 14 of the rotor 10 and the interior surface 24 of the first housing 22, by shearing, milling and kneading. The plastified material is then homogenized in the adjustable tapering processing space 34 of decreasing diameter between the second surface 18 of the rotor 10 and the interior surface 32 of the second housing 30 by shearing, stretching, and mixing the material in a spiral path of decreasing diameter. The homogenized material is then injected through the discharge opening 38 in the center of the interior surface 32 of the second housing 30 and through the injection cylinder 72 attached thereto by the injection screw 54 which extends through the rotor 10, rotates and moves axially through the discharge opening 38 and the injection cylinder 72.

Figure 3:
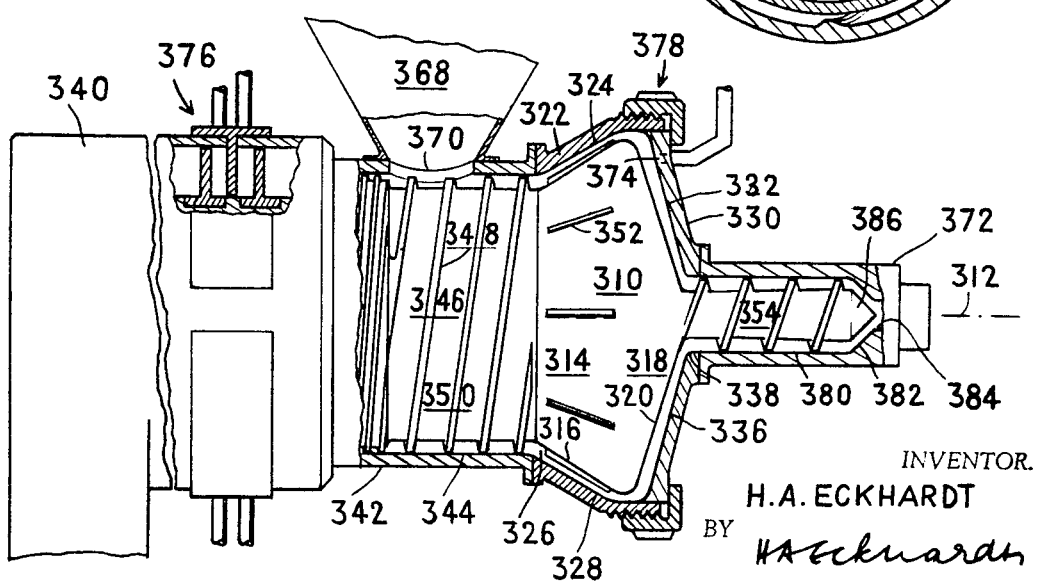
FIG. 3 is an elevational view, partly in section, of another embodiment of the invention.

In FIG. 3, the apparatus for processing plastic materials comprises a rotor 310 having a first portion 314 increasing in radial width from a first diameter, the rotor entrance diameter, to a larger diameter, the maximum rotor diameter, thus forming an increasing rotor circumference. The rotor 310 has a second portion 318 decreasing in width from the maximum diameter of the rotor 310 toward the axis 312, thus forming a decreasing rotor circumference. A housing 322 with inner surfaces surrounds the rotor 310 in opposite spaced relationship to define a processing space 326 therebetween. The housing 322 has a first inner surface portion 324 increasing in radial width from a diameter, the entrance housing diameter, to a larger diameter, the maximum housing diameter, thus forming an increasing inner housing circumference. The housing 322 has a second inner surface portion 332 decreasing in radial width from said maximum housing diameter toward a discharge opening 338 in the center of the second inner surface portion 332. The first surface portions 314, 324 of the rotor 310 and of the housing 322 diverge from the rotor axis 312 at angles which are substantially smaller than the angles between the second surface portions 318, 332 of the rotor 310 and housing 322, and the rotor axis 312.

Means for rotatably driving the rotor 310 are contained in the rear housing 340. Means are provided for introducing plastic material in the processing space 326 between the first portion 314 of the rotor 310 and the first interior surface portion 324 of the housing 322. These means comprise a barrel 342 attached to the housing 322, with an interior surface 344 extending from the first interior surface portion 324 of the housing 322 and approaching that first interior surface portion 324 at a radius equal to the housing entrance radius. A feed screw 346 extends through the barrel 342, has helical flights 348 with close clearance to the interior surface 344 of the barrel 342, has a screw root 350 with a radius equal to the rotor entrance radius, and is attached to the rotor 310 at that rotor entrance radius. Plastic material is fed from a hopper 368 through an opening 370 in the barrel 342.

The generatrices 316, 320 of the first and second rotor-surfaces 314, 318, and the generatrices 328, 336 of the first and second housing interior surface portions 324, 332 are substantially straight lines forming substantially conical surfaces. The rotor surface 314 has protrusions in the form of ribs 352 which extend toward the surrounding opposite housing surface 324. An opening 374 is provided in the housing 322 near the maximum housing radius for devolatilizing gases and vapors, and for introducing additives to the plastic material being processed. Means are provided for axially moving the rotor 310, the first and second housing portions 322, 330 relatively to each other, so that the spaced relationship between the rotor 310 and the interior surface portions 324, 332 can be varied and controlled. Hydraulic means 376 are shown schematically for axial movement of the rotor 310, and mechanical means 378 are shown schematically for axial movement of the second housing portion 330.

An extrusion barrel 372 is attached with the one end thereof to the second housing portion 330, and has an inner surface 380 coaxial with the rotor axis 312 and communicating with the discharge opening 338. The inner surface 380 of the extrusion barrel 372 decreases at the other end thereof radially in axial direction in a tapering surface 382 to an extrusion opening 384. An extrusion screw 354 is connected to the center of the rotor 310, extends through the discharge opening 338 and in the extrusion barrel 372, and has at the end thereof a tip 386 in spaced relationship to and tapering correspondingly to the tapering surface 382 of the extrusion barrel 372, so that the space between the tapering extrusion screw tip 386 and the tapering surface 382 is varied and controlled simultaneously with the space between the second rotor surface portion 318 and the second housing portion surface 332.

Figure 4:
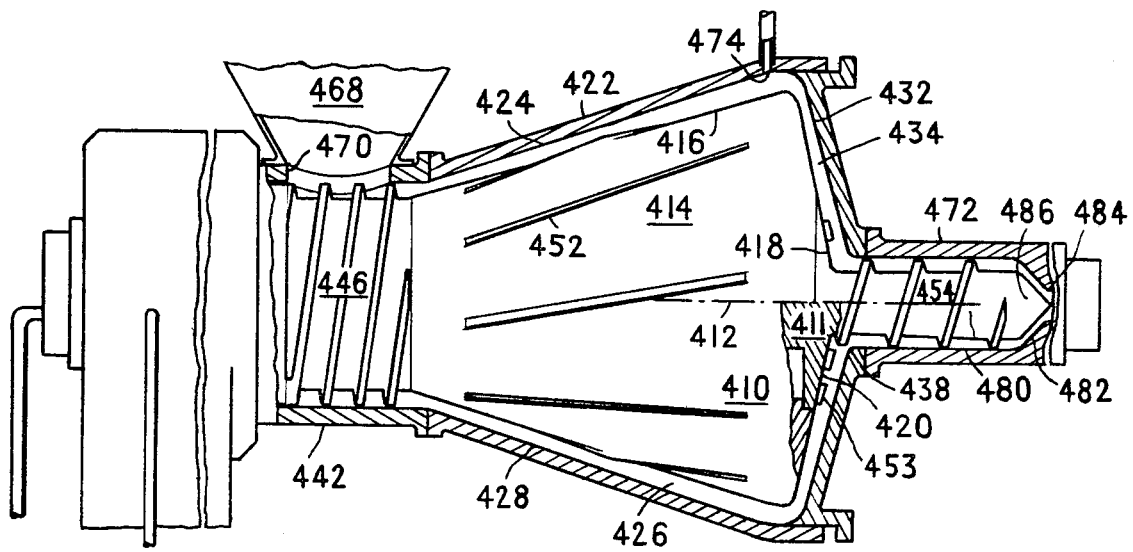
FIG. 4 is an elevational view, partly in section, of a further embodiment of the invention, particularly suitable for extruding plasticized polyvinyl chloride.

FIG. 4 shows an embodiment particularly suitable for extruding plasticized polyvinyl chloride and other materials with similar elastic and viscous characteristics. A first rotor 410 mounted for rotation about an axis 412 thereof, has a surface 414 with a generatrix 416 having a radial distance to the axis 412 increasing from a first radius, the rotor entrance radius, to a maximum rotor radius, then decreasing to a radius, the intermediate radius. A second rotor 411 coaxial with the first rotor 410 and mounted for rotation about the axis 412 has a surface 418 closely adjacent to the surface 414 with a generatrix 420 having a radial distance to the axis 412 decreasing from the intermediate radius toward the axis 412. A housing 422 has a first interior surface 424 and a second interior surface 432 surrounding the first rotor 410 and the second rotor 411 in spaced relationship to define processing spaces 426 and 434 therebetween, and having a generatrix 428 with a radial distance to the axis 412 first increasing from a radius, the housing entrance radius, to a larger radius, the maximum housing radius, then decreasing from the maximum housing radius to a smaller radius, the radius of a discharge opening 438 in the center of the second interior surface 432, the axis of the discharge opening 438 coincident with the rotor axis 412.

The rotor surfaces 414, 418 have protrusions 452, 453 extending toward the surrounding opposite housing surfaces 424, 432. The protrusions 452 are ribs for milling and working the plastic material, while the protrusions 453 force the plastic material toward the center of the second rotor 411 compensating for the loss in centripetal force due to the increasing width of the processing space 434. An opening 474 is provided in the housing 422 for devolatilizing gases and vapors. The rotors 410, 411 and the housing surfaces 424, 432 are axially movable relatively to each other, so that the spaced relationship between the rotors 410, 411, and the surfaces 424, 432 can be varied and controlled.

Means for introducing plastic material in the processing space 426 between the first rotor surface 414 and the first housing surface 424 comprise a barrel 442, a feed screw 446, and a hopper 468 communicating with an opening 470 in the barrel 442. An extrusion barrel 472 is attached to the housing 422 and has an inner surface 480 which decreases radially in axial direction in a tapering surface 482 to an extrusion opening 484. An extrusion screw 454 is connected to the center of the second rotor 411, extends through the discharge opening 438 and in the extrusion barrel 472, and has at the end thereof a tip 486 tapering correspondingly to the tapering surface 482, so that the space therebetween is varied and controlled simultaneously with the space between the rotors 410, 411 and the second housing surface 432.

Figure 5:
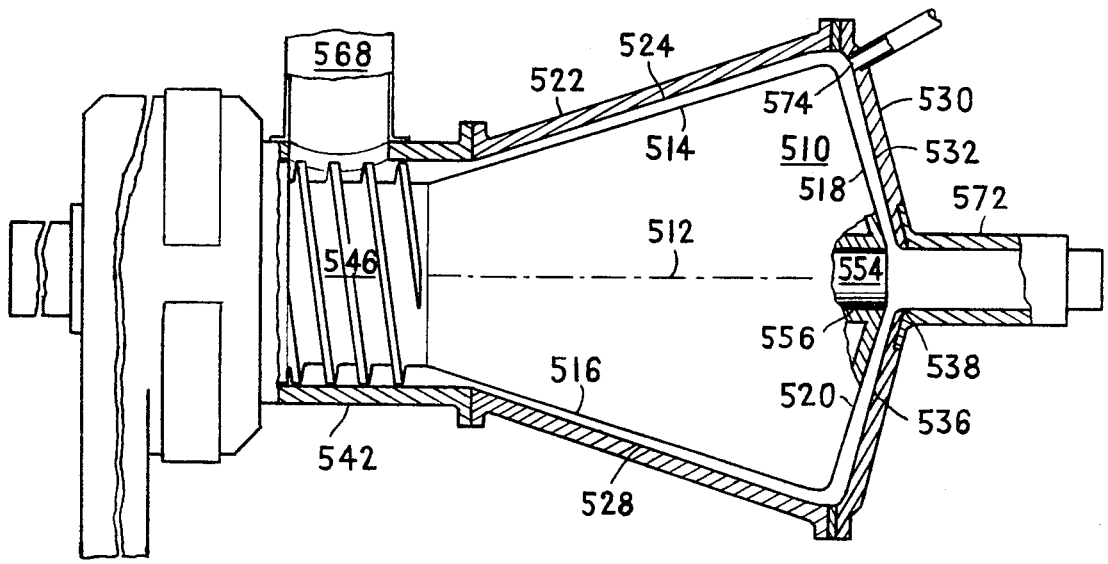
FIG. 5 is an elevational view, partly in section, of still a further embodiment of the invention, especially developed for injection molding plasticized polyvinyl chloride.

FIG. 5 shows an embodiment particularly suitable for molding plasticized polyvinyl chloride and other materials with similar elastic and viscous characteristics. A rotor 510 is mounted for rotation about an axis 512 thereof and has a first surface 514 and a second surface 518. A first housing 522 has an interior surface 524, and a second housing 530 has an interior surface 532. The generatrices 516, 528 of the first rotor surface 514 and of the first housing surface 524 are disposed to the rotor axis 512 at angles which are substantially smaller than the angles between the generatrices 520, 536 of the second rotor surface 518 and of the second housing surface 532, and the rotor axis 512. The generatrices 516, 528 of the first rotor surface 514 and of the first housing surface 524 form acute angles between opposite proximate sections of these surfaces, and the generatrices 520, 536 of the second rotor surface 518 and the second housing surface 532 form acute angles between opposite proximate sections of these second surfaces. An opening 574 is shown as provided in the second housing 530 for devolatilizing gases and vapors.

The rotor 510, the first and second housings 522 and 530 are axially movable relatively to each other, so that the spaced relationship between the rotor surfaces 514, 518 and the housing surfaces 524, 532 can be varied and controlled. Means for introducing plastic materials in the processing space between the first rotor surface 514 and the first housing surface 522 comprise a barrel 542, a feed screw 546, and a hopper 568 communicating with the barrel 542. An injection piston 554 extends through a coaxial bore 556 in the rotor 510 and is mounted for axial movement through a discharge opening 538 and in an injection cylinder 572.

In the various embodiments, several surfaces are shown to be provided for sealing against plastic material, or gases, or hydraulic fluids. The seals, however, are not shown because of their size and for better clarity. Also not shown are bolts, screws, and nuts to connect parts shown as being connected, for example shown as being provided with flanges for such connections.

Any apparatus for processing plastic materials is usually provided with means for heating and cooling, for measuring and recording temperature, pressures, flow and other variables. Such means are not shown in the various embodiments, since their illustration and description would obstruct the drawings and their description. It is obvious to any one skilled in the art that the apparatus of the invention is provided with generally known means for heating and cooling, measuring and recording of temperatures, pressures, flow and other variables. Such means may include, for example, flow channels for heating and cooling fluids in housings, barrels, cylinders, rotors and screws, or heating elements connected thereto.

Although the present invention has been described in conjuncttion with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:

1. Apparatus for processing plastic materials comprising
a rotor mounted for rotation about an axis thereof, having a first surface with a generatrix having a radial distance to said axis increasing from a first radius, the rotor entrance radius, to a larger radius, the maximum rotor radius;
said rotor having a second adjacent surface with a generatrix having a radial distance to said axis decreasing from said maximum rotor radius to said axis and forming with said axis angles substantially larger than forty-five degrees;
a first housing having an interior surface surrounding the first rotor surface in spaced relationship to define a processing space therebetween, said interior surface having a generatrix with a radial distance to said axis increasing from a first radius, the housing entrance radius, to a larger radius, the maximum housing radius, said maximum rotor radius being substantially larger than the housing entrance radius;
a second housing having an interior surface disposed over the entire circumference to the second rotor surface in opposite closely spaced relationship to define an annular processing space therebetween and in symmetry to said axis, said second housing interior surface having over the entire circumference a generatrix forming with said axis angles substantially larger than forty-five degrees, with a radial distance to said axis decreasing from said maximum housing radius to the radius of a discharge opening in the center of said second housing surface, said discharge opening radius being substantially smaller than the maximum rotor radius and the housing entrance radius, the axis of said discharge opening coincident with said rotor axis;
the first rotor surface having a larger axial length than the second rotor surface, and the first housing surface having a larger axial length than the second housing surface;
means for rotating said rotor;
means for introducing plastic material in the processing space between said first housing and said first rotor surfaces in axial direction.

2. Apparatus for processing plastic material as claimed in claim 1 wherein the generatrices of the first rotor and first housing surfaces are disposed to the rotor axis at angles which are substantially smaller than forty-five degrees.

3. Apparatus for processing plastic materials comprising
a rotor having a first portion increasing in radial width from a first diameter, the rotor entrance diameter, to a larger diameter, the maximum rotor diameter, thus forming an increasing rotor circumference;
said rotor having a second portion decreasing in width from said maximum rotor diameter to said axis, thus forming a decreasing rotor circumference;
a housing with inner surfaces surrounding said rotor in opposite closely spaced relationship to define an annular processing space therebetween over the entire circumference;
said housing having a first inner surface portion increasing in radial width from a diameter, the entrance housing diameter, to a larger diameter, the maximum housing diameter, thus forming an increasing inner housing circumference;

said housing having a second inner surface portion decreasing over the entire circumference in radial width from said maximum housing diameter to a discharge opening in the center of said inner surface portion;

said first rotor and housing surface portions diverging from the rotor axis at angles which are substantially smaller than the angles between the second rotor and housing surface portions and said rotor axis, said latter angles being substantially larger than forty-five degrees;

the first rotor portion having a larger axial length than the second rotor portion, the first housing surface portion having a larger axial length than the second housing surface portion;

means for rotatably driving said rotor;

means for introducing plastic material in the processing space between the first portion of the rotor and the first inner surface portion of the housing in axial direction.

4. Apparatus for procesing plastic materials as claimed in claim 1 wherein a second rotor coaxial with and extending through said first rotor and mounted for rotation about said axis, has a surface closely adjacent to the first rotor surface with a generatrix having to said axis a radial distance decreasing from a radius, the intermediate radius, to said axis.

5. Apparatus for processing plastic materials as claimed in claim 1 wherein the generatrices of the first and second rotor surfaces and of the first and second housing interior surfaces are substantially straight lines forming substantially conical surfaces.

6. Apparatus for processing plastic materials as claimed in claim 1 wherein the generatrices of the fisrt rotor surface form acute angles with the generatrices of the first housing interior surface.

7. Apparatus for processing plastic material as claimed in claim 1 wherein the generatrices of the first rotor surface and of the first housing interior surface form acute angles between opposite proximate sections of said first surfaces, the generatrices of the second rotor surface and of the second housing interior surface forming acute angles between opposite proximate sections of said second surfaces.

8. Apparatus for processing plastic materials as claimed in claim 1 wherein the generatrix of the first rotor surface has a gradual transition to the generatrix of the second rotor surface, the generatrix of the first housing interior surface having a gradual transition to the generatrix of the second housing interior surface.

9. Apparatus for processing plastic materials as claimed in claim 1 wherein the rotor surfaces have protrusions extending toward the surrounding opposite housing surfaces.

10. Apparatus for processing plastic materials as claimed in claim 1 wherein the housing interior surfaces have protrusions extending toward the surrounding opposite rotor surfaces.

11. Apparatus for processing plastic materials as claimed in claim 1 wherein an opening is provided in the housing interior surface near the maximum housing radius for devolatilizing gases and vapors, and for introducing additives to the plastic material being processed.

12. Apparatus for processing plastic materials as claimed in claim 1 wherein means are provided for axially moving the rotor, the first and second housing relatively to each other, so that the spaced relationship between the rotor and the housing interior surfaces can be varied and controlled.

13. Apparatus for processing plastic materials comprising a rotor mounted for rotation about an axis thereof, having a first surface with a generatrix having a radial distance to said axis increasing from a first radius, the rotor entrance radius, to a larger radius, the maximum rotor radius;

said rotor having a second adjacent surface with a generatrix having a radial distance to said axis decreasing from said maximum rotor radius to said axis;

a first housing having an interior surface surrounding the first rotor surface in spaced relationship to define a processing space therebetween, said interior surface having a generatrix with a radial distance to said axis increasing from a first radius, the housing entrance radius, to a larger radius, the maximum housing radius, said maximum rotor radius being substantially larger than the housing entrance radius;

a second housing having an interior surface disposed over the entire circumference to the second rotor surface in opposite closely spaced relationship to define an annular processing space therebetween and in symmetry to said axis, said second housing interior surface having over the entire circumference a generatrix with a radial distance to said axis decreasing from said maximum housing radius to the radius of a discharge opening in the center of said second housing surface, said discharge opening radius being substantially smaller than the maximum rotor radius and the housing entrance radius, the axis of said discharge opening coincident with said rotor axis;

the first rotor surface having a larger axial length than the second rotor surface, and the first housing surface having a larger axial length than the second housing surface;

means for rotating said rotor;

means for introducing plastic materials in the processing space between said first housing and said first rotor surfaces comprising a barrel attached to said first housing with an interior surface extending from the first housing interior surface, said barrel interior surface approaching said first housing interior surface at a radius equal to the housing entrance radius;

a feed screw extending through said barrel having helical flights with close clearance to said barrel interior surface, said feed screw having a screw root with a radius equal to the rotor entrance radius, said feed screw being attached to said rotor at that rotor entrance radius;

an extrusion screw extending from the center of said second rotor surface through said discharge opening, said extrusion screw being coaxial with and attached to said rotor.

14. Apparatus for processing plastic materials as claimed in claim 1 wherein an injection screw extends through a coaxial cylindrical bore in said rotor, mounted rotatably and axially movable through said discharge opening;

means for rotatably and axially moving said injection screw.

15. Apparatus for processing plastic materials as claimed in claim 1 wherein an injection piston extends through a coaxial bore in said rotor mounted for axial movement through said discharge opening, and means for axially moving said injection piston.

16. Apparatus for processing plastic materials as claimed in claim 4 wherein an extrusion screw coaxial with said second rotor and attached to the center threof, extends through said discharge opening with close clearance.

17. Apparatus for processing plastic materials comprising a rotor mounted for rotation about an axis thereof, having a first surface with a generatrix having a radial distance to said axis increasing from a first radius, the rotor entrance radius, to a larger radius, the maximum rotor radius;

said rotor having a second adjacent surface with a generatrix having a radial distance to said axis decreasing from said maximum rotor radius to said axis;

a first housing having an interior surface surrounding the first rotor surface in spaced relationship to define a processing space therebetween, said interior surface having a generatrix with a radial distance to said axis increasing from a first radius, the housing entrance radius, to a larger radius, the maximum housing radius, said maximum rotor radius being substantially larger than the housing entrance radius;

a second housing having an interior surface disposed over the entire circumference to the second rotor surface in opposite closely spaced relationship to define an annular processing space therebetween and in symmetry to said axis, said second housing interior surface having over the entire circumference a generatrix with a radial distance to said axis decreasing from said maximum housing radius to the radius of a discharge opening in the center of said second housing surface, said discharge opening radius being substantially smaller than the maximum rotor radius and the housing entrance radius, the axis of said discharge opening coincident with said rotor axis;

the first rotor surface having a larger axial length than the second rotor surface, and the first housing surface having a larger axial length than the second housing surface;

means for rotating said rotor;

means for introducing plastic material in the processing space between said first housing and said first rotor surfaces in axial direction;

means provided for axially moving the rotor, the first and second housing relatively to each other, so that the spaced relationship between the rotor and the housing interior surfaces can be varied and controlled;

an extrusion barrel attached at the one end thereof to the second housing having an inner surface coaxial with the rotor axis and communicating with said discharge opening, said inner surface of said extrusion barrel at the other end thereof decreasing radially in axial direction in a tapering surface to an extrusion opening;

an extrusion screw connected to the center of said rotor and extending through said discharge opening and in said extrusion barrel, said extrusion screw having at the end thereof a tip in spaced relationship to and tapering correspondingly to said tapering surface of said extrusion barrel inner surface, so that the space between said tapering extrusion screw tip and said tapering surface of said extrusion barrel is varied and controlled simultaneously with the space between the second rotor surface and the second housing.

18. Apparatus for extruding plastic materials comprising a rotor mounted for rotation about an axis thereof, having a first surface with a generatrix having a radial distance to said axis increasing from a first radius, the rotor entrance radius, to a larger radius, the maximum rotor radius;

said rotor having a second adjacent surface with a generatrix having a radial distance to said axis decreasing from said maximum rotor radius to said axis;

a first housing having an interior surface surrounding the first rotor surface in spaced relationship to define a processing space therebetween, said interior surface having a generatrix with a radial distance to said axis increasing from a first radius, the housing entrance radius, to a larger radius, the maximum housing radius, said maximum rotor radius being substantially larger than the housing entrance radius;

a second housing having an interior surface disposed over the entire circumference to the second rotor surface in opposite closely spaced relationship to define an annular processing space therebetween and in symmetry to said axis, said second housing interior surface having over the entire circumference a generatrix with a radial distance to said axis decreasing from said maximum housing radius to the radius of a discharge opening in the center of said second housing surface, said discharge opening radius being substantially smaller than the maximum rotor radius and the housing entrance radius, the axis of said discharge opening coincident with said rotor axis;

the first rotor surface having a larger axial length than the second rotor surface, and the first housing surface having a larger axial length than the second housing surface;

means for rotating said rotor;

means for introducing plastic material in the processing space between said first housing and said first rotor surfaces in axial direction;

the generatrices of the first rotor and first housing surfaces being disposed to the rotor axis at angles which are substantially smaller than the angles between the generatrices of the second rotor and second housing surfaces and the rotor axis;

the generatrices of the first and second rotor surfaces and of the first and second housing interior surfaces being substantially straight lines forming substantially conical surfaces, the rotor surfaces having protrusions extending toward the surrounding opposite housing surfaces, an opening being provided in the housing interior surface near the maximum housing radius for devolatilizing gases and vapors, and for introducing additives to the plastic material being processed;

means being provided for axially moving the rotor, the first and second housing relatively to each other, so that the spaced relationship between the rotor and the housing interior surfaces can be varied and controlled;

the means for introducing plastic materials comprising a barrel attached to said first housing with an interior surface extending from the first housing interior surface, said barrel interior surface approaching said first housing interior surface with a radius equal to the housing entrance radius, a feed screw extending through said barrel having helical flights with close clearance to said barrel interior surface, said feed screw having a screw root with a radius equal to the rotor entrance radius, said feed screw being attached to said rotor at that rotor entrance radius;

an extrusion screw extending from the center of said second rotor surface through said discharge opening, said extrusion screw being coaxial with and attached to said rotor;

an extrusion barrel attached at the one end thereof to the second housing having an inner surface coaxial with the rotor axis and communicating with said discharge opening, said inner surface of said extrusion barrel at the other end thereof decreasing radially in axial direction in a tapering surface to an extrusion opening;

said extrusion screw extending in said extrusion barrel, having at the end thereof a tip in spaced relationship to and tapering correspondingly to said tapered surface of said extrusion barrel inner surface, so that the space between said tapering extrusion screw tip and said tapering surface of said extrusion barrel is varied and controlled simultaneously with the space between the second rotor surface and the second housing.

19. Apparatus for molding plastic materials as claimed in claim 2 wherein the generatrices of the first and second rotor surfaces and of the first and second housing interior surfaces are substantially straight lines forming substantially conical surfaces;

the housing interior surfaces having protrusions extending toward the surrounded opposite rotor surfaces;

means being provided for axially moving the rotor, the first and second housing relatively to each other, so that the spaced relationship between the rotor and the housing interior surfaces can be varied and controlled;

the means for introducing plastic materials comprising a barrel attached to said first housing with an interior surface extending from the first housing interior surface, said barrel interior surface approaching said first housing interior surface with a radius equal to the housing entrance radius, a feed screw extending through said barrel having helical flights with close clearance to said barrel interior surface, said feed screw having a screw root with a radius equal to the rotor entrance radius, said feed screw being attached to said rotor at that rotor entrance radius;

an injection screw extending through a coaxial cylindrical bore in said rotor, mounted rotatably and axially movable through said discharge opening and an injection cylinder attached thereto;

means for rotatably and axially moving said injection screw.

References Cited

UNITED STATES PATENTS

| | | | |
|---|---|---|---|
| 3,499,186 | 3/1970 | Sassa | 18—12 SP |
| 1,320,718 | 11/1919 | Steinle | 18—12 SF |
| 2,469,999 | 5/1949 | Stober | 18—12 SF |
| 2,744,287 | 5/1956 | Parshall | 18—12 SF |
| 2,763,896 | 9/1956 | Vogt | 18—2 EM X |
| 2,779,054 | 1/1957 | Doriat | 18—12 SF X |
| 3,025,565 | 3/1962 | Doriat | 18—12 SF X |
| 3,045,283 | 7/1962 | Keiser | 18—12 SE X |
| 3,204,291 | 9/1965 | McWhorter | 18—12 SI |
| 3,371,379 | 3/1968 | Reifenhäuser | 18—12 SI |

FOREIGN PATENTS

| | | | |
|---|---|---|---|
| 1,274,285 | 9/1961 | France | 18—30 SR |
| 381,132 | 1963 | Japan | 18—30 SR |

J. SPENCER OVERHOLSER, Primary Examiner

B. D. TOBOR, Assistant Examiner

U.S. Cl. X.R.

425—131, 208, 242, 326